(12) United States Patent
Bailey

(10) Patent No.: US 6,894,270 B2
(45) Date of Patent: May 17, 2005

(54) SENSOR FOR WASHROOM DEVICE WITH A NON-CIRCULAR SENSING ZONE

(75) Inventor: Robert William Bailey, Mossley (CA)

(73) Assignee: Delta Faucet Canada, Ontario (CA)

( * ) Notice: Subject to any disclaimer, the term of this patent is extended or adjusted under 35 U.S.C. 154(b) by 97 days.

(21) Appl. No.: 10/286,079

(22) Filed: Nov. 1, 2002

(65) Prior Publication Data

US 2004/0084609 A1 May 6, 2004

(51) Int. Cl.[7] .......................... G06M 7/00; H01J 40/14
(52) U.S. Cl. .................................. 250/221; 250/559.4
(58) Field of Search ............................. 250/221, 222.1, 250/338.1, 339.06, 559.4, 559.38, 239, 216; 4/304, 313, 623; 251/129.04

(56) References Cited

U.S. PATENT DOCUMENTS

| | | | | |
|---|---|---|---|---|
| 4,282,430 A | * | 8/1981 | Hatten et al. | ................ 250/221 |
| 4,972,070 A | | 11/1990 | Laverty, Jr. | |
| 5,025,516 A | * | 6/1991 | Wilson | ............................ 4/623 |
| 5,225,689 A | * | 7/1993 | Buckle et al. | ............ 250/559.4 |
| 5,254,853 A | * | 10/1993 | Reich | ........................ 250/221 |
| 5,508,511 A | | 4/1996 | Zur et al. | |
| 5,950,983 A | | 9/1999 | Jahrling | |
| 6,056,261 A | | 5/2000 | Aparicio et al. | |
| 6,127,671 A | | 10/2000 | Parsons et al. | |
| 6,161,814 A | * | 12/2000 | Jahrling | .................. 251/129.04 |
| 6,212,697 B1 | * | 4/2001 | Parsons et al. | ................ 4/302 |
| 6,691,979 B2 | * | 2/2004 | Parsons et al. | ......... 251/129.04 |
| 2003/0029992 A1 | * | 2/2003 | Kudo et al. | .................. 250/221 |

FOREIGN PATENT DOCUMENTS

| | | |
|---|---|---|
| JP | 09 063347 A | 3/1997 |
| JP | 2002 303683 A | 10/2002 |

OTHER PUBLICATIONS

PCT International Search Report, dated Jan. 30, 2004.

* cited by examiner

Primary Examiner—Thanh X. Luu
Assistant Examiner—Seung C. Sohn
(74) Attorney, Agent, or Firm—Carlson, Gaskey & Olds

(57) ABSTRACT

A washroom device sensor uses at least one infrared beam that forms a longitudinal, rather than spot-shaped, sensing zone for detecting the presence of a user. The increased detection area of the longitudinal sensing zone ensures that at least a portion of the beam will contact a user using the washroom device. The beam may be adjustable in two or more directions to generate two or more sensing zones in different positions, allowing optimization of the sensing zone location with respect to a particular washroom device and the anticipated position of the device user.

28 Claims, 2 Drawing Sheets

SENSOR FOR WASHROOM DEVICE WITH A NON-CIRCULAR SENSING ZONE

TECHNICAL FIELD

The present invention relates to sensors for electronic control of washroom devices, and more particularly to a sensor that detects the presence of a user of a washroom device.

BACKGROUND OF THE INVENTION

Many public washrooms have incorporated sensors that automatically operate various washroom devices, such as urinals, water closets, hand dryers, faucets, and soap dispensers. Sensors are particularly useful when coupled to a flush valve, allowing urinals and water closets to be flushed without manual operation by the user. Generally, sensors transmit an infrared beam in a desired direction; if the beam is reflected from a user of the device back toward a receiver in the sensor, power is applied to operate the washroom device (e.g. actuating a flush valve for a toilet, opening a faucet valve, etc.).

Currently used sensors transmit a beam having a spot-shaped sensing zone, which covers a small sensing area and/or has a low, diffused power density. The beam itself is pointed forward, creating a sensing zone that is directly in front of the flush valve on which the sensor is mounted. If the sensor is mounted on a water closet with a toilet, the height of the beam may cause the beam to miss a user if, for example, the user is seated rather than standing in the water closet and cause the sensor to fail to activate the flush valve. This may lead the user to believe that the sensor and flush valve are not working even when they are functioning normally.

Attempts to remedy this problem may entail adding a refractive layer that changes the infrared beam's direction. Although this change allows the beam to detect a user in a different position, there is still the possibility that the beam will miss the user (e.g., the beam may travel between a user's legs if the water closet is being used as a urinal). The refracted beam also does not allow the beam direction to be adjusted based on the type of washroom device on which the sensor would be mounted. Because different washroom devices have different predicted user positions, a sensor having a beam optimized in one direction for a given washroom device may not be optimized for another washroom device.

There is a desire for a sensor that can detect a washroom device user more accurately.

There is also a desire for a washroom device sensor that allows adjustment of a beam direction.

SUMMARY OF THE INVENTION

The present invention is directed to a washroom device sensor that uses at least one infrared beam to detect the presence of a user. The beam is spread to form a sensing zone having a longitudinal sensing zone, such as a linear, elliptical, or rectangular zone. The increased detection area of the longitudinal sensing zone ensures that at least a portion of the beam will contact a user using the washroom device.

In one embodiment, the sensor allows the beam direction to be adjusted between two or more positions to generate at least two sensing zones, such as a first sensing zone and a second sensing zone spaced vertically apart from the first sensing zone. A particular zone can be selected by either adjusting a position of a beam emitter itself, by changing a beam direction, or switching between two or more emitters that emit beams in different directions. By providing a beam adjustment mechanism, the inventive sensor can be adapted easily for different washroom devices requiring different user positions.

BRIEF DESCRIPTION OF THE DRAWINGS

FIG. 3 is a diagram illustrating sensing zones used by the sensor according to one embodiment of the invention.

DETAILED DESCRIPTION OF THE EMBODIMENTS

Figure 1:
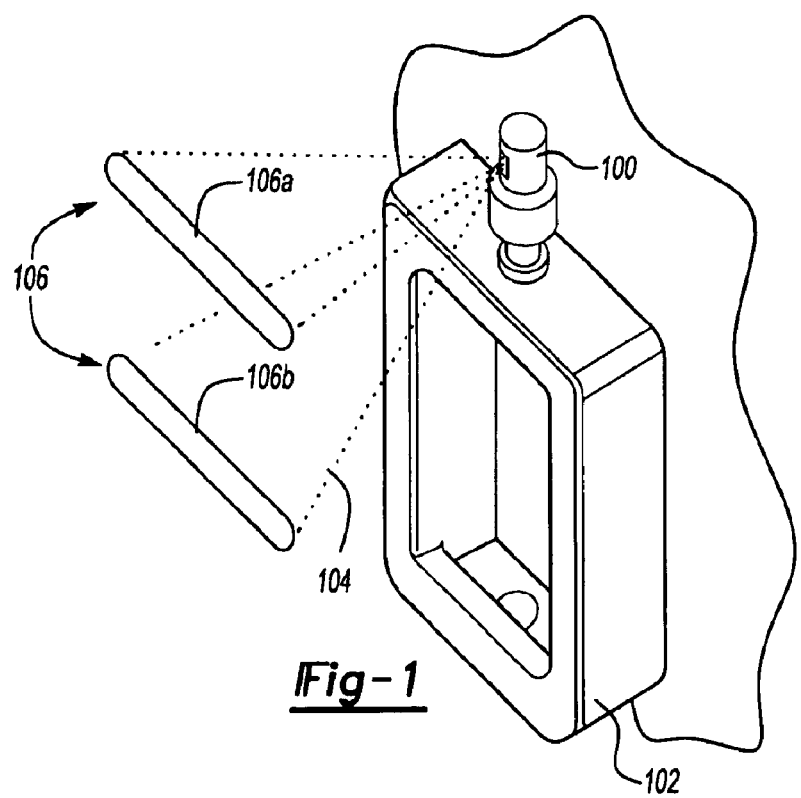
FIG. 1 is a representative diagram of a washroom device incorporating a sensor according to one embodiment of the invention.
Figure 2:
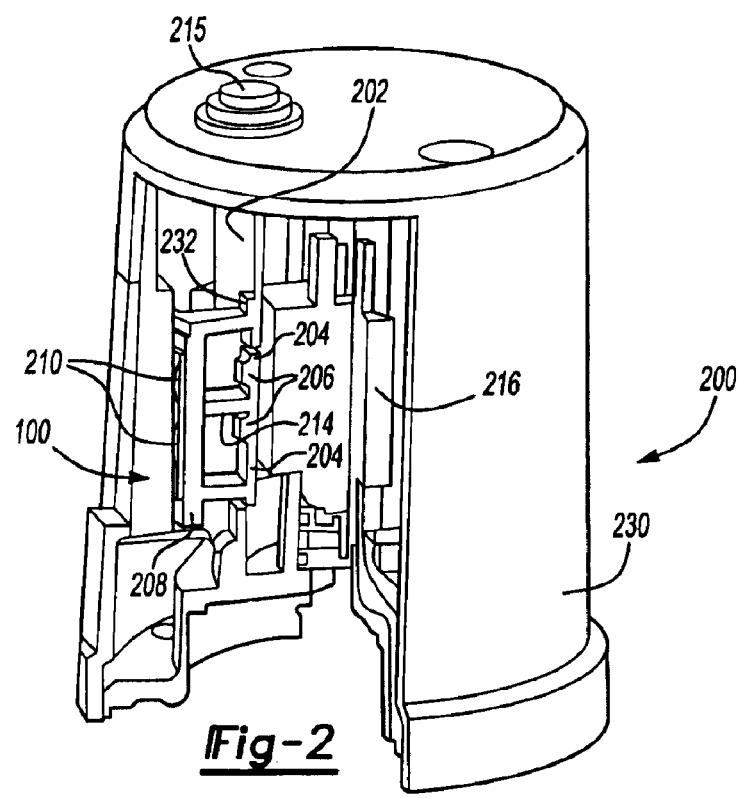
FIG. 2 is a cutaway view of the sensing device according to one embodiment of the invention.

FIGS. 1 and 2 illustrate a sensor 100 and its operating environment according to one embodiment of the invention. FIG. 1 illustrates the sensor 100 mounted onto a urinal 102, but the sensor 100 can also be mounted in a water closet that can be used as both a urinal and a toilet, a sink faucet, hand dryer, soap dispenser, bathing apparatus (e.g., shower, tub) or any other washroom device. For simplicity, the term "washroom device 102" will cover all possible devices that can be used in conjunction with the sensor 100 and is not limited to the urinal shown in FIG. 1.

Figure 3:
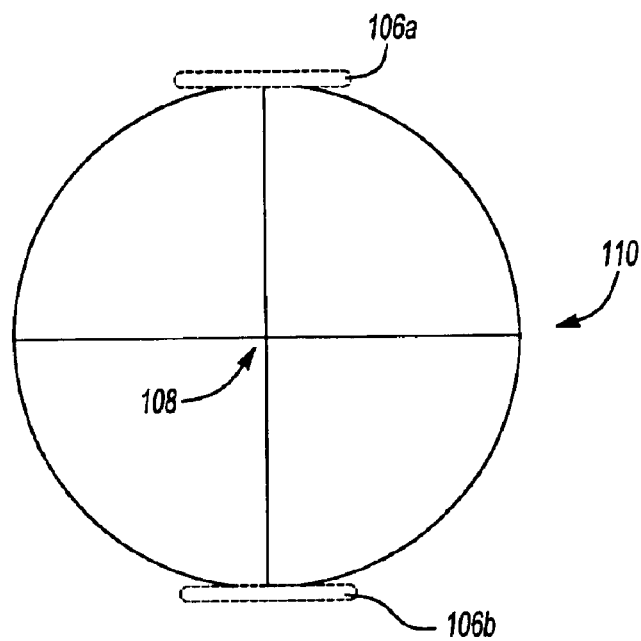
FIG. 3 is a cutaway view of the sensing device according to one embodiment of the invention.

As shown in FIGS. 1 and 3, the sensor 100 is able to transmit a beam 104 that can be directed to cover at least two sensing zones 106. In one embodiment, the beam 104 is an infrared beam that forms a longitudinal sensing zone 106. Possible sensing zone shapes include a line, ellipse, rectangle, or any other shape having a width longer than its height.

By using a longitudinal sensing zone 106 rather than a spot-shaped zone, the inventive sensor 100 detects the presence of a user more accurately because the beam provides a larger detection range with a higher power density and makes it more likely for at least a portion of the beam's path to contact a user of the washroom device. The longitudinal sensing zone 106 allows detection of users even with variations in the user's height, proportions, and orientation relative to the washroom device 102 because the zone's shape ensures that at least a portion of the beam 104 will be reflected from a user using the device 102 back into the sensor 100. As is clear from the figures. The longitudinal sensing zone having a cross-sectional shape that is non-circular with an elongated dimension in one direction, and a smaller dimension in another direction. By describing the sensing zone as "longitudinal." applicant means that the sensing zone could be otherwise described as being non-circular with a cross-sectional shape having a first larger dimension in one direction and a shorter dimension in another direction.

The beam direction can be adjusted so that sensing zone 106 position is optimized for a given washroom device. FIGS. 1 through 4 illustrate one embodiment where the beam 104 direction can be switched to create either a high sensing zone 106a or a low sensing zone 106b. As shown in FIG. 3, the high and low zones 106a, 106b respectively lie above and below a center point 108 of an optical range 110 rather than directly at the center point 110. In one embodiment, the sensing zones 106 are about 6 inches long when viewed approximately 42 inches away from the sensor 100.

Figure 4:
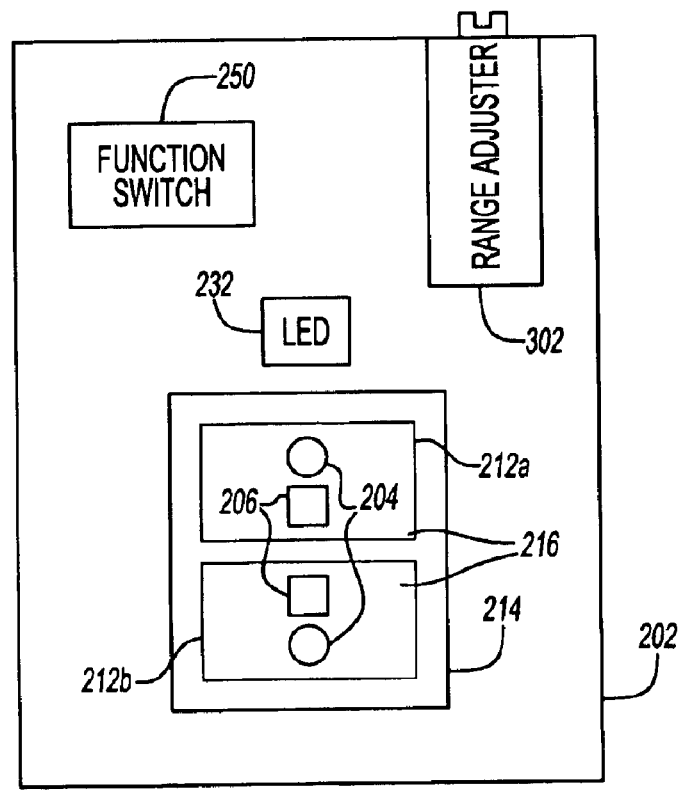
FIG. 4 is a representative diagram of a circuit board according to one embodiment of the invention.

FIG. 2 is a cutaway view of a flush valve 200 incorporating the sensor 100 according to one embodiment of the invention. As is known in the art, flush valves are often used in conjunction with toilets and urinals. The sensor 100 is implemented via a circuit board 202, at least one emitter 204 that emits the beam 104, at least one receiver 206 that detects a beam reflected from an object (e.g., a user using the washroom device), and an optic structure 208 that correspond with the emitter 204 and the receiver 206. The embodiment shown in FIGS. 2 and 4 illustrate a sensor 100 that has two emitters 204, one that emits a beam associated with the high sensing zone 106a and one that emits a beam associated with the low sensing zone 106b. Alternatively, the sensor 100 may incorporate a single emitter 204 whose beam direction can be adjusted (e.g., through an adjustable mounting structure) to form the high and low zones 106a, 106b. Providing vertical adjustability of the beam direction further improves the detection capabilities of the beam and allows the sensor to be adapted to different types of washroom devices that may have different optimal sensing zones, depending on the anticipated position of the device user (e.g., standing or sitting).

During installation of the sensor 100 to the washroom device 102, the installer can select the beam orientation (e.g., high or low) that will provide a desired sensing zone location. The actual beam selection can be conducted via a switch, such as a DIP switch 250 (see FIG. 4), or other beam adjustment means. Possible alternative beam adjusters may include other types of switches, electrical controllers, software, actuators, or any other mechanism that can change the beam direction from the emitter by controlling the emitter 204 itself and/or by controlling the optic device(s) (lens) 210 associated with the emitter 204.

The optic structure 208 may include an optic device 210 associated with each emitter 204. For example, if there are two emitters 204, the sensor 100 may include two optic devices 210, one associated with each emitter 204. In one embodiment, each optic device 210 is a known collimating optic set having an optics lens that forms the emitter output into a fine, round beam, and a cylindrical lens that spreads the round beam horizontally to form a beam having a longitudinal sensing zone. Other optic devices 210 known in the art may be used to shape the emitter 204 output to form the desired sensing zone shape. Alternative embodiments may include multiple optic devices 210 associated with each emitter 204 or different ratios between the optic devices 210 and the emitters 204.

In one embodiment, the emitters 204 and receivers 206 are grouped into emitter/receiver pairs 212a. In the embodiment shown in FIGS. 2 and 4, the top emitter 204 and receiver 206 are arranged so that the receiver 206 lies above the emitter 204, while the bottom emitter/receiver pair are arranged in a mirror image with respect to the top pair (i.e., where the receiver 206 lies below the emitter 204). To prevent false triggering, the emitter/receiver pairs 212a, 212b are arranged inside a tunnel 214 having a compartment 215 for each pair 212a, 212b. The tunnel 214 ensures that the receivers 206 beams only from the front of the sensor 100.

During installation of the/sensor 100 to the washroom device 102, the installer can select the beam orientation (e.g., high or low) that will provide a desired sensing zone location. The actual beam selection can be conducted via a switch, such as a DIP switch, or other beam adjustment means. Possible alternative beam adjusters may include other types of switches, electrical controllers, software, actuators, or any other mechanism that can change the beam direction from the emitter by controlling the emitter 204 itself and/or by controlling the optic device(s) 210 associated with the emitter 204.

In one embodiment, if the installer selects a low sensing zone 106b as the desired zone, the emitter 204 in the pair 212a will transmit the infrared beam through the top optic device. If a user is within the detection range of the beam, the beam will bounce off the washroom device user, travel through the bottom optic device and be detected by the receiver 206 in the bottom pair 212b. Conversely, if the installer selects a high sensing zone 106a, the beam will bounce off the user, travel through the top optic device and be detected by the receiver 206 in the top pair 212a. If the sensor 100 incorporates a different number of emitter and receivers and/or if the emitters and receivers are arranged in a configuration different than that shown in the Figures, then the beam emission and detection patterns may be modified as well according to principles within those of ordinary skill in the art.

In addition to the sensor 100 circuitry itself, the flush valve 200 shown in FIG. 3 includes a solenoid valve 216 coupled to the sensor 100, a manual washroom device actuator 215, and a housing 230. The solenoid valve 216 can be actuated by the sensor 100 via any known manner. If the sensor 100 will be used with a washroom device other than a toilet, urinal, etc., then the sensor 100 would be coupled with other components specific to that washroom device.

To provide visual feedback to the user, the sensor 100 may also include a visible light source 232, such as an LED. In one embodiment, the visible light source 232 is mounted above the optic structure 208 rather than within the tunnel 214. The beam emitted by the visible light source 232 can simply be output through the housing 230, without being transmitted through any optics. The visible light source 232 allows the user to determine whether he or she is correctly aligned with the sensor 100 by checking whether the light beam is visible on his or her body.

FIG. 4 is a representative diagram of one circuit board 202 that can be used in the inventive sensor 100. As explained above, the emitters 204 and receivers 206 can be arranged in pairs 212a, 212b, with each pair 212a, 212b placed inside a compartment 215 of the tunnel 214. In the embodiment shown in FIG. 4, the installer can select the beam direction, and therefore the sensing zone height, via a function selection switch 250, such as a DIP switch, which connects the emitter/receiver pair 212a, 212b corresponding to a selected sensing zone height with a power supply. The function selection switch 250 therefore allows selection of the beam direction without having to modify any optics within the sensor 100. Any other control device may also be used to select an emitter/detector pair. If a single emitter 204 is used, to adjust the beam direction of the emitter 204 by, for example, changing the position of the emitter 204 itself or placing a refractive lens in front of the emitter 204. A range adjuster 302 may also be incorporated to adjust the sensitivity of the sensor 100 by setting a threshold level at which the receiver 206 would recognize the presence of the reflected beam.

Although the above description focuses on incorporating the inventive sensor in a flush valve for a urinal or water closet, the sensor can be incorporated in any washroom device where automatic operation is desired (e.g., sink faucet, soap dispenser, shower, hand dryer, etc.) without departing from the scope of the invention.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A washroom device sensor, comprising:
   an emitter that emits a beam, wherein the beam forms a longitudinal sensing zone;
   a receiver that detects the beam when is reflected from an object, said longitudinal sensing zone having a cross-sectional share that is non-circular with an elongated dimension in one direction, and a smaller dimension in another direction; and
   said receiver communicating with a control for a washroom device to actuate the washroom device.

2. The washroom device sensor of claim 1, further comprising an optic device associated with the emitter, wherein the optic device spreads the beam emitted by the emitter to form the longitudinal sensing zone.

3. The washroom device sensor of claim 1, further comprising a beam adjuster that changes a position of the longitudinal sensing zone between at least a first position and a second position.

4. The washroom device sensor of claim 3, wherein the beam adjuster is one selected from the group consisting of an emitter position changing device and a beam direction changing device.

5. The washroom device sensor of claim 3, wherein said beam adjuster is a switch that allows the selection of distinct locations for said longitudinal sensing zone.

6. The washroom device sensor of claim 1, further comprising a visible light source that transmits a visible light beam.

7. The washroom device sensor of claim 1, wherein the emitter transmits an infrared beam.

8. The washroom device sensor of claim 1, wherein the emitter is a first emitter and the receiver is a first receiver, wherein the washroom device sensor further comprises a second emitter and a second receiver, wherein the first emitter and the first receiver form a first pair and the second emitter and second receiver form a second pair, wherein the longitudinal sensing zone is a first longitudinal sensing zone and wherein the second emitter emits a second beam that forms a second longitudinal sensing zone.

9. The washroom device sensor of claim 8, wherein the first longitudinal sensing zone is vertically spaced apart from the second longitudinal sensing zone.

10. The washroom device sensor of claim 8, wherein the first and second emitters and the first and second receivers are arranged such that the second receiver receives a first reflected beam emitted from the first emitter and the first receiver receives a second reflected beam emitted from the second emitter.

11. The washroom device sensor of claim 8, further comprising a first optic device associated with the first emitter and a second optic device associated with the second emitter, wherein the first and second optic devices spread the beam emitted by the first and second emitters, respectively, to form the first and second longitudinal sensing zones.

12. The washroom device of claim 8, further comprising a beam adjuster that controls at least one of the first emitter and the second emitter.

13. The washroom device of claim 12, wherein the beam adjuster actuates one of said first emitter and second emitter at a time.

14. The washroom device of claim 8, further comprising a tunnel that separates the first pair and the second pair.

15. An apparatus for operating a washroom device, comprising:
   a washroom device actuator; and
   a washroom device sensor operably coupled to the washroom device actuator, the sensor comprising
   a first emitter and a first receiver forming a first pair, the first emitter emitting a first infrared beam forming a first longitudinal sensing zone;
   a second emitter and a second receiver forming a second pair, the second emitter emitting a second infrared beam forming a second longitudinal sensing zone vertically spaced apart from the first longitudinal sensing zone; and
   a beam adjuster that actuates one of said first emitter and second emitter, and wherein said first and second longitudinal sensing zones each having a non-circular cross-sectional shape, with an elongate dimension in one direction, and a smaller dimension in another direction.

16. The apparatus of claim 15, wherein the washroom device is one selected from the group consisting of a toilet, urinal, water closet device, faucet, hand dryer, soap dispenser, and bathing apparatus.

17. The washroom device sensor of claim 15, wherein the first and second emitters and the first and second receivers are arranged such that the second receiver receives a first reflected beam emitted from the first emitter and the first receiver receives a second reflected beam emitted from the second emitter.

18. The apparatus of claim 15, further comprising a first optic device associated with the first emitter and a second optic device associated with the second emitter, wherein the first and second optic devices spread the beam emitted by the first and second emitters, respectively, to form the first and second longitudinal sensing zones.

19. The apparatus of claim 15, further comprising a visible light source that transmits a visible light beam.

20. A method of operating a washroom device, comprising:
   emitting a beam forming a longitudinal sensing zone;
   detecting a reflected beam indicating a presence of a washroom device user in the longitudinal sensing zone, wherein said longitudinal sensing zone has a cross-sectional shape that is non-circular with a first elongate dimension in one direction and a smaller dimension in another direction; and
   actuating the washroom device based on the detection of the reflected beam.

21. The method of claim 20, further comprising adjusting the longitudinal sensing zone to a selected position.

22. The method of claim 20, wherein the emitting act comprises selecting between emission of a first beam forming a first longitudinal sensing zone and emission of a second beam second longitudinal sensing zone.

23. The method of claim 20, wherein the emitting act comprises emitting an infrared beam, and wherein the method further comprises transmitting a visible light beam with the infrared beam.

24. An apparatus for operating a washroom device, comprising:
- a flush valve; and
- a sensor operably coupled to the flush valve, comprising
    - an emitter that emits an infrared beam, wherein the beam forms a longitudinal sensing zone, wherein said longitudinal sensing zone has a cross-sectional shape that is non-circular with a first elongate dimension in one direction and a smaller dimension in another direction;
    - a receiver that detects the beam when is reflected from an object; and
    - at least one optic device associated with the emitter, wherein the optic spreads the beam emitted by the emitter to form the longitudinal sensing zone.

25. The apparatus of claim 24, further comprising a beam adjuster that changes a position of the longitudinal sensing zone between at least a first position and a second position.

26. The apparatus of claim 24, wherein the emitter is a first emitter and the receiver is a first receiver, and wherein the sensor further comprises a second emitter and a second receiver, wherein the first emitter and the first receiver form a first pair and the second emitter and second receiver form a second pair,
- wherein the longitudinal sensing zone is a first longitudinal sensing zone and
- wherein the second emitter emits a second beam that forms a second longitudinal sensing zone vertically spaced apart from the second longitudinal sensing zone.

27. The apparatus of claim 26, wherein the first and second emitters and the first and second receivers are arranged such that the second receiver receives a first reflected beam emitted from the first emitter and the first receiver receives a second reflected beam emitted from the second emitter.

28. The apparatus of claim 26, further comprising a beam adjuster that actuates one of the first emitter and the second emitter at a time.

* * * * *